March 17, 1942.  R. POLK, JR  2,277,003

FRUIT PEELER

Filed Dec. 20, 1940  2 Sheets-Sheet 1

INVENTOR.
Ralph Polk Jr,
BY
Hood & Hahn
ATTORNEYS

March 17, 1942. R. POLK, JR 2,277,003
FRUIT PEELER
Filed Dec. 20, 1940  2 Sheets-Sheet 2

INVENTOR.
Ralph Polk Jr.,
BY Hood & Hahn
ATTORNEYS.

Patented Mar. 17, 1942

2,277,003

UNITED STATES PATENT OFFICE 2,277,003

FRUIT PEELER

Ralph Polk, Jr., Haines City, Fla., assignor to The Polk Development Company (Unincorporated), Tampa, Fla.

Application December 20, 1940, Serial No. 370,931

8 Claims. (Cl. 146—3)

The object of my invention is to provide an improved mechanism by means of which citrus fruits may be efficiently peeled at low cost.

The accompanying drawings illustrate my invention.

Figures 1, 4:
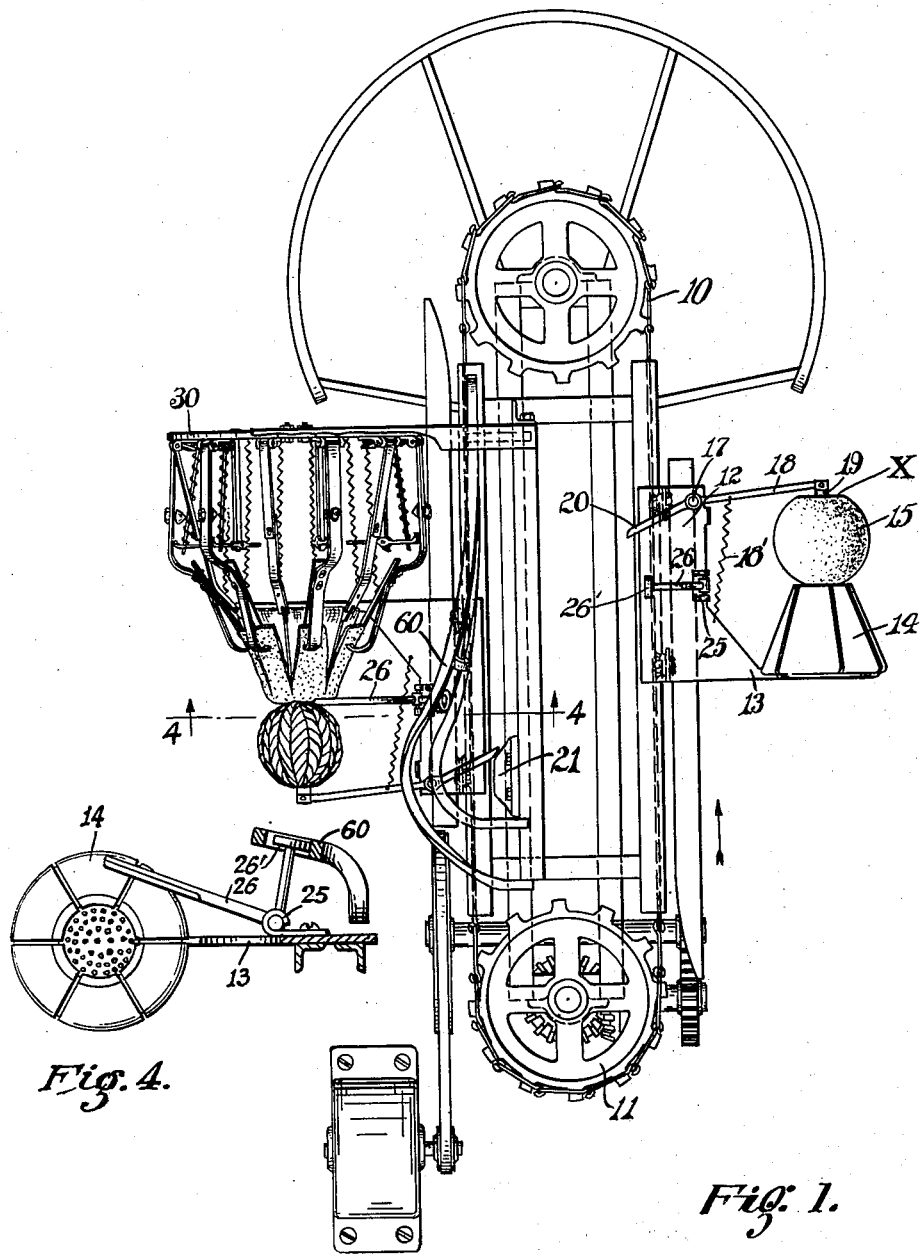
Figure 2:
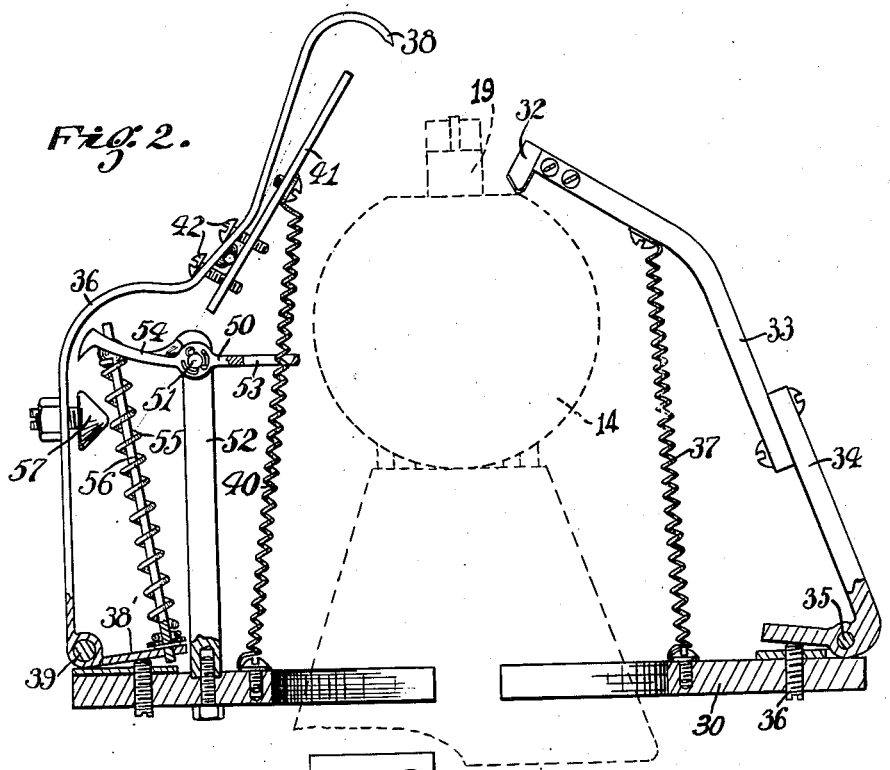
Figure 3:
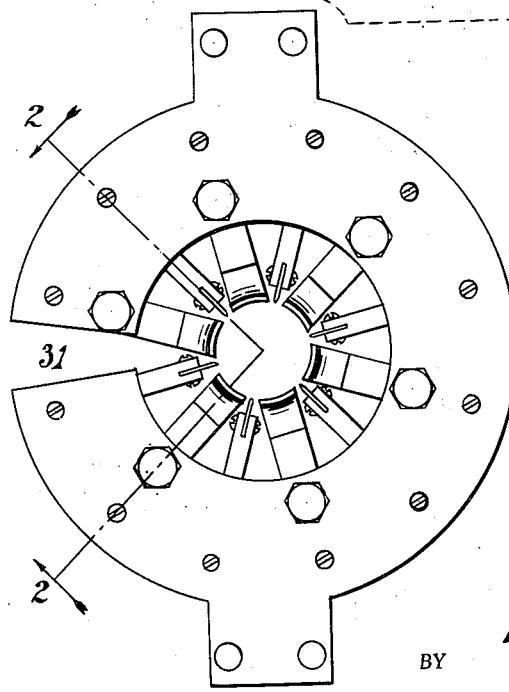

Fig. 1 is a plan of an embodiment of my invention;

Fig. 2 an axial section, on line 2—2 of Fig. 3, and on a scale larger than that of Fig. 1, through the peeler element omitting, for the sake of clarity, parts which are duplicates of the parts shown;

Fig. 3 an end elevation of the peeler element; and

Fig. 4 is a fragmentary section on line 4 of Fig. 1.

In the drawings 10 indicates a horizontally positioned endless carrier provided with driving means 11 by which the carrier may be caused to move through its cycle. Carrier 10 is provided with a plurality of fruit holders, each of which comprises a bracket 12 connected to the carrier 10 and having a horizontally extending thin finger 13 which carries, at its outer end, a conical shell 14 arranged with its axis horizontal. The open smaller end of shell 14 provides a seat for the fruit 15. Pivoted at 17 on bracket 12 is a horizontally swinging arm 18 provided, at its outer end, with a fruit holding head 19 which may be brought into alignment with the axis of shell 14, so as to engage the fruit 15 and hold it in position. The free end of arm 18 is yieldingly urged toward shell 14 by a spring 18' and the inner end 20 of arm 18 is arranged so as to engage a cam 21, just after the peel of the fruit has been stripped away, so that head 19 is withdrawn from engagement with the fruit. Pivoted at 25 on bracket 12 is a bell crank lever 26, one arm of which is arranged to be swung in a vertical plane just in advance of the smaller end of shell 14 so as to strip the nearly completely skinned fruit from its final point of adherence with the skin.

A split ring 30 arranged in a vertical plane with its opening 31 in such position that finger 13 may pass freely therethrough, is held in a stationary position, as indicated in Fig. 1. This ring carries an annular series of skin slitting knives 32 each of which is carried by a finger 33 adjustably attached to a supporting lever 34 pivoted at 35 and swing limited inwardly by a temper screw 36. Each knife 32 is yieldingly urged to fruit engaging position by spring 37.

Interdigitated with the knife series is an annular series of skin engaging rakers 38 pivoted at 39 on ring 30 and each urged inwardly by spring 40, the upper end of which is attached to a finger 41 adjustably connected to the raker arm by taper screws 42—42. The free end of finger 41 is projected to a point where it will be engaged by the larger end of shell 14 in such manner as to insure clearance of the overhanging raker 38 as the shell 14 passes through its cycle.

In order that the pressure of the raker against the fruit may be increased at an intermediate point in its operation, I provide, in conjunction with each raker, a lever 50 pivoted at 51 on a standard 52. The inwardly projecting arm of lever 50 is slotted at 53 to permit spring 40 to pass therethrough and the inner end of said arm is arranged in the path of movement of the larger end of shell 14. The outwardly projecting arm 54 of lever 50 straddles the upper end of a compression spring 55 which is prevented from buckling by means of a rod 56 projected therethrough. The lower end of spring 55 engages the inwardly projecting arm 38' which is part of the raker arm 38 so that, as shell 14 engages the inner arm of lever 50, the outer arm 54 presses downwardly upon spring 55. This action occurs about the time the largest diameter of the fruit is reached by the ends of the rakers so that, as movement of the fruit continues, an increased pressure is exerted upon the rakers to cause their ends to hug closely against the decreasing diameter of the fruit.

An adjustable conical nub 57 carried by raker arm 38 is arranged in the path of movement of the free end of arm 54 of lever 50 so that the raker 38 will be positively retracted from the path of movement of shell 14 in case it passes through the peeling head without an accompanying fruit, thereby insuring against engagement of the front end of shell 14 by the overhanging raker.

Adjacent the peeling element, I provide a cam track 60 into which a roller 26' carried by lever 26 passes as the bracket 12 is moving through the peeler element so that, just as arm 20 of lever 18 engages cam 21, the wiper arm 26 will pass between the nearly peeled fruit and the peeling to discharge the peeled fruit from the apparatus.

As a preliminary operation, each fruit has a polar cap removed, as indicated at X in Fig. 1, to expose the fruit preferably at the bud pole. This cap removal is quite conveniently a hand operation so that the operator may select the proper pole of the fruit. As bracket 12 approaches the position shown at the right in Fig. 1, the operator retracts arm 18, inserts a fruit 15 between the small end of shell 14 and head 19 and, releasing arm 18, positions the fruit between the small end of shell 14 and head 19. Further advancement of bracket 12 carries it through the split ring 30 and, as the fruit reaches the position indicated in dotted lines in Fig. 2 and then progresses through the apparatus, the slitting knives 32 operate to slit the skin of the fruit on meridian lines, the effective portions of the knives 32 being such as to just penetrate the fruit skin. As the fruit advances, it comes into engagement with fingers 41 so as to position rakers 38 properly to engage the exposed forward ends of the skin segments and, as the fruit proceeds further, these rakers serve to strip the skin segments backwardly over the fruit, the pressure of the rakers against the fruit being augmented at about the time the equator of the fruit is reached by the action of shell 14 on the inwardly projecting arms of levers 50. The denuded fruit, as it proceeds, passes between the free ends of the rakers and cutters and, when it reaches the point shown at the left in Fig. 1, head 19 is withdrawn and wiper arm 26 serves to discharge the completely peeled fruit from the apparatus. The operator then removes the peeling from the smaller end of shell 14 so that another fruit may be placed in position for manipulation.

It will be readily understood that one of the essential characteristics of this mechanism is that the fruit holder passes through, beyond, and back to the slitting and raking mechanism without reverse movement back through said mechanism and that, therefore, the necessary relative axial movement may be either of the fruit holder, as shown, or of the slitting and raking groups.

I claim as my invention:

1. A citrus fruit peeler comprising a circumferential group of skin-slitters and skin-rakers formed to engage skin segments and strip them from the body of the fruit and each of said slitters and rakers movable in a plane radially of the group, a fruit holder, and means for projecting said holder axially through said group of slitters and rakers and back to the receiving end of the group without reverse movement therethrough.

2. A citrus fruit peeler comprising a circumferential group of skin-slitters and skin-rakers formed to engage fruit skin segments and strip them from the fruit and each of said slitters and rakers being movable in a plane radially of the group, a fruit holder comprising a base block and an associated head between which a fruit may be held, and means for successively projecting said holder axially in one direction only through, beyond and return to, said group of slitters and rakers.

3. A peeler of the character specified in claim 1 and comprising a striker arm arranged to engage the peeled fruit subsequent to emergence from the slitter and raker group and move it transversely of the line of movement of the fruit-holder, and means coordinated with the holder-projecting means to actuate said striker.

4. A peeler of the character specified in claim 2 and comprising a striker arm arranged to engage the peeled fruit subsequent to emergence from the slitter and raker group and move it transversely of the line of movement of the fruit-holder, and means coordinated with the holder-projecting means to actuate said striker.

5. A citrus fruit peeler comprising a circumferential group of spring fingers each provided with a skin-slitting knife at its free end, a coordinated circumferential group of spring fingers each provided, at its free end, with skin-engaging means such as to cause separation of the skin segment from the fruit body, said groups of fingers being coordinated about a common axis with their free ends biased toward said axis and movable outwardly therefrom, a fruit holder, and means for causing repeated one-way relative axial movement between the fruit holder and the slitting and raking group.

6. In a fruit peeler, a circular series of raker arms each having a skin-engaging portion movable in a plane substantially radial to the axis of the series, means yieldingly resisting movement of said portion away from the axis of the series, and means actuable by a fruit-carrier to augment the force acting to return the raker arm to initial position.

7. In a fruit peeler, a circular series of raker arms each having a skin-engaging portion movable in a plane substantially radial to the axis of the series, means yieldingly resisting movement of said portion away from the axis of the series, and means actuable by a fruit-carrier in the absence of a fruit to move said skin-engaging portion outwardly beyond the initial end of the fruit-carrier.

8. In a fruit peeler, a circular series of raker arms each pivoted on an axis tangential to the axis of the series and each having a skin-engaging portion, a spring acting on each arm to bias it inwardly, a second spring acting on each arm to bias it inwardly, and a lever actuable by a fruit-carrier to increase the effect of said second spring on its raker arm.

RALPH POLK, Jr.